March 25, 1930.  H. V. JAMES  1,752,179
ELECTRIC MOTOR CONTROL SYSTEM
Filed May 12, 1927
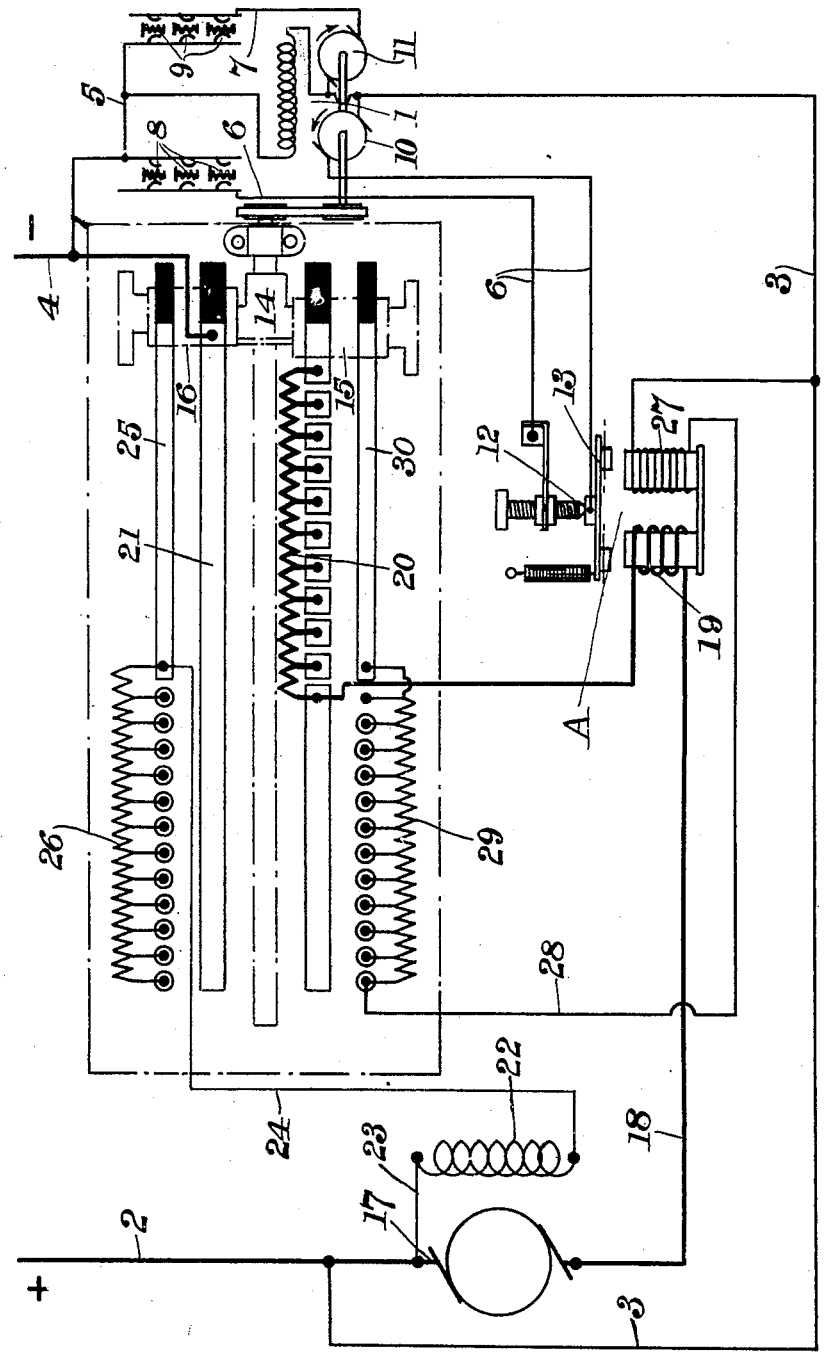
INVENTOR
H. V. JAMES,
BY Jno Inure
ATTY.

Patented Mar. 25, 1930

1,752,179

UNITED STATES PATENT OFFICE

HENRY VINCENT JAMES, OF RADLETT, ENGLAND

ELECTRIC-MOTOR-CONTROL SYSTEM

Application filed May 12, 1927, Serial No. 190,940, and in Great Britain June 9, 1926.

My invention relates to electric motor automatic control systems where the speed regulating means or controller is motor driven and usually operated by switches such as push button switches at remote stations. Such a control system is described in the specification of my British Letters Patent No. 109,890.

An object of the present invention is the provision of a control system employing a switch energizing coil in the main power motor circuit for automatically preventing the too rapid acceleration of the main power motor under a given load or overload, in which the action or switch-opening tendency of the switch energizing coil is checked during normal conditions of main motor operation.

A further object of the invention is the provision of a control system as above set out in which the action of the switch energizing coil remains sensitive to overload irrespective of the quantity of normal current flowing in the main motor armature, which normal current varies, apart from loading, as the motor is accelerated or decelerated.

The control system according to my invention limits acceleration of the main motor to requirements and as a result undue strain and wear on the power plant and the switch gear are eliminated or reduced, while reasonably rapid acceleration is possible under light and medium loads.

The invention may be broadly described as consisting in making the circuit of the cotroller motor dependent for its electrical continuity upon an automatic trip switch, having its energizing coil connected in the main power motor circuit in such a manner that if the main motor is too rapidly accelerated the trip switch breaks the feed circuit to the controller operating motor and prevents further movement of the same for the purpose of acceleration of the main motor until the overload dies down.

The invention may be carried out as follows: An electromagnetically-operated trip switch, normally of the self-resetting type, having its energizing coil connected directly or indirectly in the main power motor circuit but energized proportionately with same, and a normally closed trip circuit connected in the controller driving motor circuit, in such a manner that in the event of the electromagnet operating the trip from its normally closed position, further movement of the controller motor and the consequent acceleration of the main power motor will be arrested regardless of continued operation of the accelerating or "speed up" push button switches, until such time as the trip switch automatically resets itself as the overload dies down.

The electromagnetically-operated trip switch may be adjustable as to load operation or otherwise according to requirements, preferably by the usual method of field adjustment, spring or equivalent.

When operating in connection with electric motors where the current rises approximately as the speed, such as a direct current motor under constant torque and shunt field regulation, I employ an automatic means to vary the effective operation of the device, such as by employing a second and differentially wound coil in such a manner that for normal working it partly neutralizes the flux set up by the main coil and means such as a variable resistance for variation of its effective ampere turns, so that it will proportionately and correspondingly neutralize the flux set up by the main coil as the current increase or decrease corresponding to the speed of the main power motor under field regulation and so maintain uniformity of operation of the trip switch under all such conditions irrespective of the normal current variation.

In the accompanying drawing:—

The figure is a diagrammatic view illustrating the invention.

The field windings and double wound rotor of controller motor 1 are fed on one side from main 2 by way of line 3, and on the other side from main 4 by line 5 for the field windings and by lines 5 and 6 or 5 and 7 for the rotor windings. Lines 5 and 6 or 5 and 7 are adapted to be bridged by press buttons 8 and 9, the press buttons 8 being for bringing about the energization of the rotor 10 to operate the controller motor forwardly to speed up the main motor and the press buttons 9 being for bringing about the energization of the rotor 11 for operating the controller motor in the reverse direction to slow down the main motor.

The circuit of armature 10, besides being dependent for its electrical continuity upon the press buttons 8 is also dependent upon an adjustable contact 12 and a spring controlled armature or trip 13 of a trip switch A.

Upon starting the controller motor 1 by operating a press button 8, the wormed shaft carrying arm 14 is rotated and causes the arm 14 with bridging contactors 15 and 16 to move to the left. The circuit to the rotor windings of the main motor is thus closed by way of lines 17 and 18, coil 19 of trip switch A, resistance 20 (until cut out) and contactors 15 and 16 to the negative bar 21; and the circuit of the field coils 22 of the main motor is closed by lines 23 and 24 to the bar 25, and contactor 16 to bar 21.

The resistance 20 having been cut out, main motor then rotating at its normal speed and the controller motor rotating by the operation of a speed up press button, the arm 14 will travel further to the left and introduce step by step by means of the contactor 16, the shunt field resistance 26 for regulating the motor speed between its normal and maximum speeds.

Should a given load be exceeded or overload occur normally or by too rapid operation of the controller when cutting out the resistance 20, or introducing the resistance 26, the excessive current which will flow owing to the overload will energize the coil 19 of the trip switch A sufficiently to shift the armature 13 and open-circuit the controller motor 1, thus stopping further acceleration of the main motor until the load becomes normal, irrespective of the continued operation of one of the buttons 8.

To effect uniformity of operation of the device with varying current as the main power motor is speeded up under field regulation, the neutralizing coil 27 is normally fed from line 3 through resistance 29 to bar 21 and line 4.

As the shunt field resistance 26 is introduced by the contactor and the armature current consequently increased, the series resistance 29 of the equalizing coil is cut out so that as the magnetic field set up by the coil 19 increases due to the normal increase of current, the counter-field set up by the coil 27 proportionately increases and proportionately neutralizes that of the coil 19.

In the event of an abnormal increase of current due to an overload on the main motor, the field of the coil 19 predominates and attracts and retains the armature 13 and opens switch 12, until such time as the overload is adjusted, when the current falls off and the field set up by coils 19 and 27 are again normally established, whereby the armature snaps back and again closes switch 12.

It will be readily seen that the present invention may be employed in conjunction with the electric motor controlling apparatus described in the previously mentioned specification, of my British Letters Patent No. 109,890. In this case the lines or circuits 2 and 3 may be dependent for their electrical continuity upon a trip switch operated as set out herein.

What I claim is:—

1. An electric motor control system of the type wherein a motor-driven speed regulating means or controller for a main power motor is governed by switches, comprising a trip switch controlling the continuity of the circuit for the controller motor, an electromagnet coil in the main power circuit and adapted under overload conditions of said circuit to operate the trip switch and thereby interrupt the controller motor circuit, a compensating coil having its field opposed to that of the first mentioned coil, and means for simultaneously increasing the energization of the compensating coil and decreasing the energization of the main motor field.

2. An electric motor control system of the type wherein a motor-driven speed regulating means or controller for a main power motor is governed by switches, comprising a trip switch controlling the continuity of the circuit for the controller motor, an electromagnet coil in the main power circuit and adapted under overload conditions of said circuit to operate the trip switch and thereby interrupt the controller motor circuit, a compensating coil having its field opposed to that of the first mentioned coil, and means for increasing the energization of the compensating coil as the motor field strength is decreased to thereby cause the first mentioned coil to interrupt the circuit continuity to the controller when a predetermined value of torque on the main motor is exceeded.

In testimony whereof I affix my signature.

HENRY VINCENT JAMES.